United States Patent
Hwang

(10) Patent No.: US 9,250,885 B2
(45) Date of Patent: Feb. 2, 2016

(54) IMAGE FORMING APPARATUS OPERATING BASED ON FRAMEWORK CAPABLE OF SHARING FUNCTION AMONG A PLURALITY OF BUNDLES AND METHOD OF INSTALLING BUNDLE IN IMAGE FORMING APPARATUS

(75) Inventor: Young-ki Hwang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1095 days.

(21) Appl. No.: 12/929,023

(22) Filed: Dec. 22, 2010

(65) Prior Publication Data

US 2011/0161954 A1 Jun. 30, 2011

(30) Foreign Application Priority Data

Dec. 28, 2009 (KR) ........................ 10-2009-0131835

(51) Int. Cl.
  *G06F 9/445* (2006.01)
(52) U.S. Cl.
  CPC ... *G06F 8/61* (2013.01); *G06F 8/65* (2013.01)
(58) Field of Classification Search
  CPC ............... G06F 8/60; G06F 8/61; G06F 8/62; G06F 8/63; G06F 8/64
  USPC .................................................. 717/168–178
  See application file for complete search history.

(56) References Cited

U.S. PATENT DOCUMENTS

| | | | |
|---|---|---|---|
| 6,883,163 B1 * | 4/2005 | Schwabe ....................... | 717/126 |
| 7,131,111 B2 | 10/2006 | Passanisi | |
| 7,509,638 B2 * | 3/2009 | Backhouse ............... | G06F 8/60 717/176 |
| 7,836,440 B2 * | 11/2010 | Blackman ............... | G06F 8/433 707/695 |
| 7,865,874 B2 * | 1/2011 | Wookey .................... | G06F 8/61 717/120 |
| 8,046,779 B2 * | 10/2011 | Wusthoff et al. ............. | 719/328 |
| 8,291,402 B2 * | 10/2012 | Pazdziora ................. | G06F 8/65 717/168 |
| 8,359,592 B2 * | 1/2013 | Duplessis et al. ............. | 717/174 |
| 8,683,273 B2 | 3/2014 | Jung et al. | |
| 2003/0229529 A1 * | 12/2003 | Mui et al. .......................... | 705/8 |
| 2004/0003371 A1 * | 1/2004 | Coulthard et al. ............ | 717/101 |
| 2004/0015859 A1 * | 1/2004 | Potter et al. .................... | 717/120 |
| 2005/0193388 A1 * | 9/2005 | Hayes, Jr. ..................... | 717/174 |
| 2005/0195390 A1 * | 9/2005 | Jeon et al. ................... | 356/237.2 |
| 2006/0026591 A1 * | 2/2006 | Backhouse et al. ........... | 717/177 |
| 2007/0240154 A1 * | 10/2007 | Gerzymisch .............. | G06F 8/61 717/174 |
| 2008/0046882 A1 * | 2/2008 | Blackhouse ................... | 717/174 |
| 2008/0052675 A1 * | 2/2008 | Wookey ......................... | 717/120 |

(Continued)

FOREIGN PATENT DOCUMENTS

| | | |
|---|---|---|
| KR | 10-2007-0061261 | 6/2007 |
| KR | 10-2009-0054370 | 5/2009 |
| KR | 10-2009-0068815 | 6/2009 |

OTHER PUBLICATIONS

Pro SpringSource dm Server—Gary Mak, Daniel Rubio—Apress—2009.*

(Continued)

*Primary Examiner* — Jason Mitchell
*Assistant Examiner* — Francisco Aponte
(74) *Attorney, Agent, or Firm* — Staas & Halsey LLP

(57) ABSTRACT

Provided is a method of installing a bundle in an image forming apparatus operating based on a framework capable of sharing a function among a plurality of bundles. The method includes extracting related information between the bundle and another bundle from an XML file of any one bundle; and adding the extracted related information to a file including information of the bundle.

17 Claims, 9 Drawing Sheets

(56) References Cited

U.S. PATENT DOCUMENTS

| | | | |
|---|---|---|---|
| 2008/0052676 A1* | 2/2008 | Wookey | 717/120 |
| 2008/0256225 A1 | 10/2008 | Suh et al. | |
| 2008/0320491 A1* | 12/2008 | Jung et al. | 719/313 |
| 2009/0031402 A1* | 1/2009 | Jung et al. | 726/4 |
| 2009/0144728 A1* | 6/2009 | Felts | 717/175 |
| 2009/0216801 A1 | 8/2009 | Baldwin et al. | |
| 2009/0276767 A1* | 11/2009 | Brannen et al. | 717/166 |
| 2009/0276769 A1* | 11/2009 | Brannen et al. | 717/174 |
| 2009/0282400 A1* | 11/2009 | Jung et al. | 717/174 |
| 2010/0017797 A1* | 1/2010 | Hwang | 717/174 |

OTHER PUBLICATIONS

Bundle Dependency in Open Services Gateway initiative Framework Initialization—Lusheng Liang and Andy Ju An Wang—School of Computing and Software Engineering Southern Polytechnic State Universiry GA—2002.*

A Graph-based Approach for Automatic Service Activation and Deactivation on the OSGi Platform—Chin-Yang Lin, Cheng Liang Lin, and Ting-Wei Hou, Member, IEEE—Department of Engineering Science, National, Cheng-Kung University, Tainan City—Jul. 10, 2009.*

Korean Office Action issued Aug. 13, 2015 in Korean Patent Application No. 10-2009-0131835.

* cited by examiner

FIG. 3

```
osgi> start 1117                    300
org.osgi.framework.BundleException: The bundle could not be resolve:
         at org.eclipse.osgi.framework.internal.core.BundleHost.star:
         at org.eclipse.osgi.framework.internal.core.AbstractBundle.:
         at org.eclipse.osgi.framework.internal.core.FrameworkComman:
         at sun.reflect.NativeMethodAccessorImpl.invoke0 (Native Meth:
         at sun. reflect.NativeMethodAccessorImp1.invoke (Unknown Sour:
         at sun.reflect.DelegatingMethodAccessorImpl.invoke (Unknown:
         at java.lang.reflect.Method.invoke (Unknown Source)
         at org.eclipse.osgi.framework.internal.core.FrameworkComman:
         at org.eclipse.osgi.framework.internal.core.FrameworkConsol:
         at org.eclipse.osgi.framework.internal.core.FrameworkConsol:
         at org.eclipse.osgi.framework.internal.core.FrameworkConsol:
         at java.lang.Thread.run (Unknown Source)
```

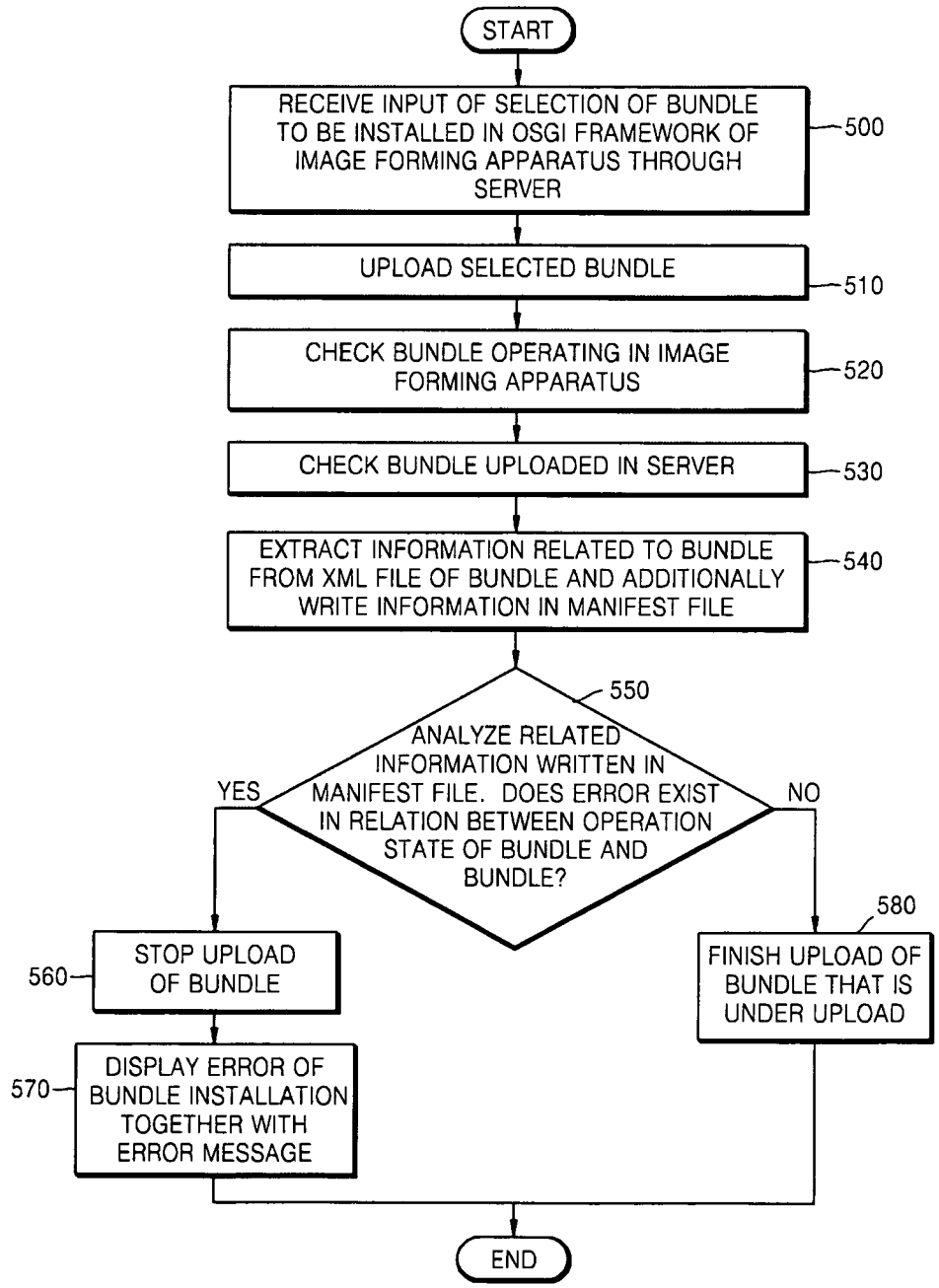

FIG. 6

```
                                                    ┌─600
┌─────────────────────────────────────────────────────┐
│ Unithru                                             │
│ * EAM (Enterprise Application Management)           │
├─────────────────────────────────────────────────────┤
│                                                     │
│   ┌──────┬─────────────────┬────────────┬──────────┐│
│   │  ID  │   Bundle Name   │    Data    │Status(610)││
│   ├──────┼─────────────────┼────────────┼──────────┤│
│   │  A   │ Device Discovery│ 2009-08-01 │ Activate ││
│   │  B   │   Device Map    │ 2009-08-01 │ Activate ││
│   │  C   │ Device Manager  │ 2009-08-01 │ Activate ││
│   │D(620)│ Device Control  │ 2009-08-01 │   Stop   ││
│   └──────┴─────────────────┴────────────┴──────────┘│
│                                                     │
│  [ STOP ] [Activate] [ADD(630)] [Delete] [ Exit ]   │
└─────────────────────────────────────────────────────┘
```

```
<osgi:service
id="EventBeanResourceListenerOsgi" <800>
ref="EventBeanResourceListenerBeanId" <810> interface="org.osgi.service,event,EventHandler"
>                                       <820>
   <osgi:service-properties>
   <entry key="event,to pics">
   <value
type="java,;ang,String[]"com/samsung.dpd/af
w/sdk/log/event/+</value>
   </entry>
   </osgi:service=properties>
</osgi:service>
```

Header Name (910) :
Interface Name (920) ;
Description (930) ;
Involved interface (Interface name FROM reference Bundle name) (940)

Inport - Interface (1010) :
abc (1020) ;
this is for device control, Bundle D (1030) ;
Involved interface (ccc from Bundle B; aab from Bundle C ; bbb from Bundle D) (1040)

USPATENT US 9,250,885 B2

IMAGE FORMING APPARATUS OPERATING BASED ON FRAMEWORK CAPABLE OF SHARING FUNCTION AMONG A PLURALITY OF BUNDLES AND METHOD OF INSTALLING BUNDLE IN IMAGE FORMING APPARATUS

CROSS-REFERENCE TO RELATED APPLICATION

This application claims the priority benefit of Korean Patent Application No. 10-2009-0131835, filed on Dec. 28, 2009, in the Korean Intellectual Property Office, the disclosure of which is incorporated herein in its entirety by reference.

BACKGROUND

1. Field

Embodiments relate to an image forming apparatus operating based on an open service gateway initiative (OSGI) framework and a method of installing a bundle in the image forming apparatus.

2. Description of the Related Art

An open service gateway initiative (OSGI) framework is a middleware framework that is independently operated in an operating system and a platform. An OSGI framework implements a complete and dynamic component model that cannot be provided in standalone Java/Virtual Machine (VM) environments. In the OSGI framework, a service is formed and operated in units of bundles. In this instance, the bundle is a unit representing each component or application defined in the OSGI framework. The application consisting of at least one bundle can be dynamically installed, started, updated, stopped, and uninstalled at any time in the OSGI framework. As such, the OSGI framework can be used in various fields because of its functional convenience, for example, can also be used in an image forming apparatus. The bundle can also be used by exporting/importing a function of another bundle. Here, the exporting is an operation that opens a function so that another bundle can use the function, and the importing is an operation that refers to a function from another bundle. Thus, functions of bundles can be extended by being reused and recombined among the bundles. However, while a plurality of bundles refer to functions among one another, if an error is generated in one bundle and thus the bundle is not operated, all the connected bundles stop operating. As such, a reference state of the bundle needs to be analyzed in order to find a reason why the bundle does not operate, and the reference state of the bundles can be analyzed through an extensible markup language (XML) file that declared a referring interface. However, the XML file practically includes event information that is not required at runtime, and thus it is difficult to analyze the reference state between the bundles from the XML file.

SUMMARY

One or more embodiments provide an image forming apparatus operating based on an open service gateway initiative (OSGI) framework and a method of installing a bundle in the image forming apparatus.

According to an aspect of one or more embodiments, there is provided a method of installing a bundle in an image forming apparatus operating based on a framework capable of sharing a function among a plurality of bundles, the method including: extracting related information between the bundle and another bundle from an XML file of any one bundle; and adding the extracted related information to a file including information of the bundle using at least one processor.

According to another aspect of one or more embodiments, there is provided a computer readable recording medium having embodied thereon a computer program for executing the method of installing a bundle in an image forming apparatus operating based on a framework capable of sharing a function among a plurality of bundles.

According to another aspect of one or more embodiments, there is provided an image forming apparatus operating based on a framework capable of sharing a function among a plurality of bundles, a central processing unit (CPU) of the image forming apparatus including: an information extracting unit to extract related information between the bundle and another bundle from an XML file of any one bundle; and a file changing unit to add the extracted related information to a file including information of the bundle.

According to another aspect of one or more embodiments, there is provided at least one computer readable recording medium storing computer readable instructions to implement methods of one or more embodiments.

BRIEF DESCRIPTION OF THE DRAWINGS

The above and other aspects of embodiments will become more apparent by describing in detail embodiments with reference to the attached drawings in which:

FIG. 3 illustrates commands displayed when an error is generated in an OSGI framework, according to an embodiment;

FIG. 5 is a flowchart of a method of installing a bundle in an image forming apparatus operating based on an OSGI framework, according to an embodiment;

FIG. 6 illustrates a user interface for selecting a bundle, according to an embodiment;

DETAILED DESCRIPTION

One or more embodiments are described in detail with reference to the accompanying drawings.

Figure 1:
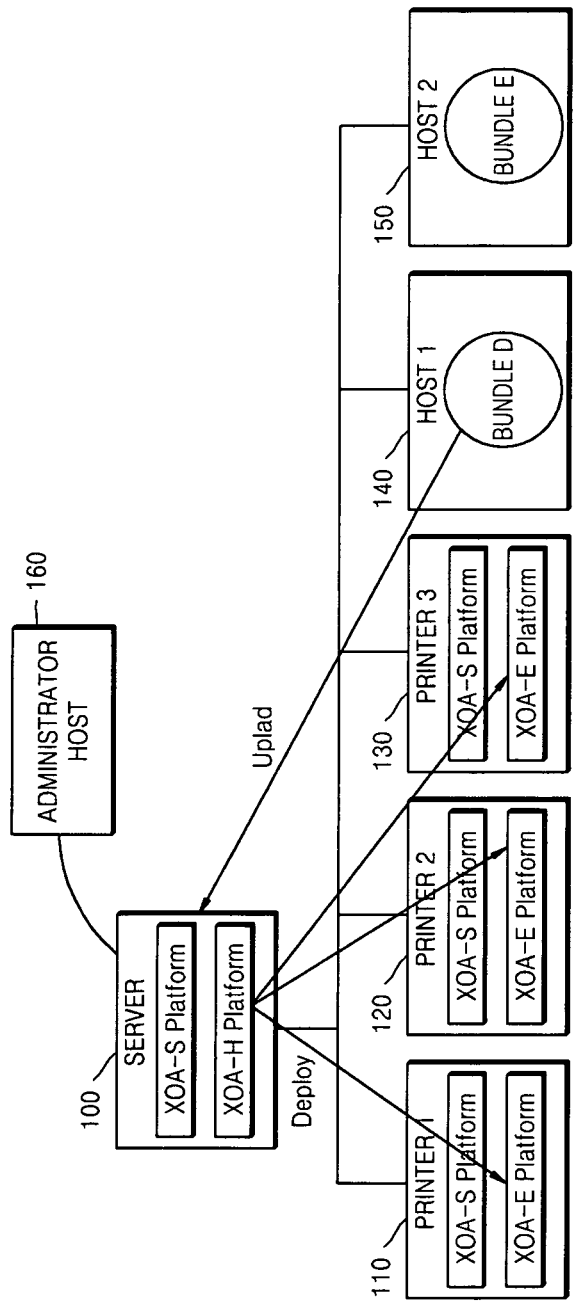
FIG. 1 illustrates an environment for installing a bundle, according to an embodiment.

FIG. 1 illustrates an environment for installing a bundle, according to an embodiment.

Referring to FIG. 1, under an environment in which a plurality of printers 110, 120, and 130, hosts 140 and 150, and an administrator host 160 are connected through wired/wireless connections or a wired/wireless network, a bundle developed in the administrator host 160 or the hosts 140 and 150 connected to a server 100 may be installed in the plurality of printers 110, 120, and 130 through the server 100. In FIG. 1, the administrator host 160 and the hosts 140 and 150 are separated from each other, but the administrator host 160 operates in the same way as the hosts 140 and 150, except that the administrator host 160 further includes a management function with respect to the server 100. As such, to install the bundle in the printers 110, 120, and 130 through the server 100, a platform for installing the bundle needs to be commonly installed in both the server 100 and the printers 110, 120, and 130. In the current embodiment, to install the bundle, an eXtended Open Architecture-S (XOA-S) platform is commonly installed in both the server 100 and the printers 110, 120, and 130 for communication between the server 100 and the printers 110, 120, and 130, and an eXtended Open Architecture-H (XOA-H) platform is installed in the server 100, and an eXtended Open Architecture-E (XOA-E) platform is installed in the printers 110, 120, and 130. Accordingly, in an embodiment, the bundle developed in the hosts 140 and 150 and the administrator host 160 is uploaded to the server 100, and the uploaded bundle may be deployed and installed in the printers 110, 120, and 130.

For example, as illustrated in FIG. 1, when a bundle D developed in the host 1 140 is uploaded to the server 100, the server 100 may deploy and install the uploaded bundle D in the printers 110, 120, and 130 connected to the server 100. In this instance, the bundle D is a minimum unit of application, and thus the application developed in the host 1 140 may be easily installed in a printer that desires to use the application at any time. As such, whenever a new application is developed, the developed application may be installed in the printer. Therefore, the developed application may be used in the printer by installing the new application in the printer that a user currently owns, without buying a printer including a new application. According to another embodiment, the bundle D developed in the host 1 140 may be directly installed in the printers 110, 120, and 130 without using the server 100. In this instance, an embedded server (not shown) is installed inside each of the printers 110, 120, and 130. According to another embodiment, when the bundle D developed in the host 1 140 is directly installed in the printers 110, 120, and 130 without using the server 100, the bundle D developed in the host 1 140 needs to be directly installed in each of the printers 110, 120, and 130.

Figure 2:
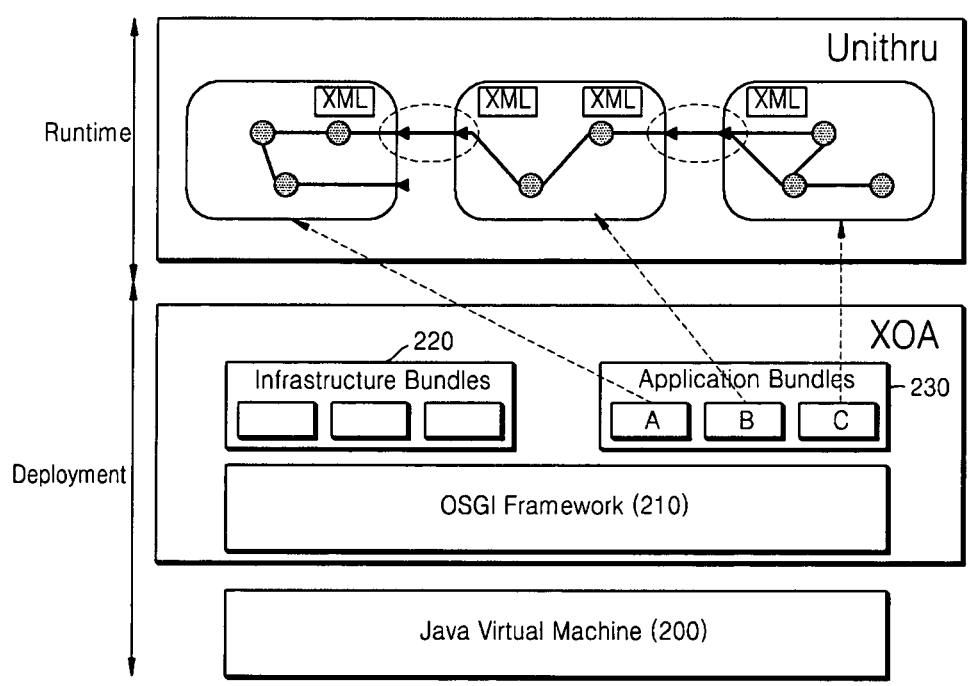
FIG. 2 illustrates an open service gateway initiative (OSGI) framework implemented in an image forming apparatus or a server, according to an embodiment.

FIG. 2 illustrates an OSGI framework 210 implemented in an image forming apparatus or a server, according to an embodiment. Referring to FIG. 2, the OSGI framework 210 is installed on a Java/virtual machine (VM) 200. Infrastructure bundles 220 and application bundles 230 are executed in the OSGI framework 210. As such, in an embodiment, an XOA platform includes the OSGI framework 210, and the infrastructure bundles 220 and the application bundles 230 that are executed in the OSGI framework 210.

Application bundles A, B, and C are connected to one another and operated in a Runtime, and referring information among the application bundles A, B, and C is written in an XML file of each of the bundles A, B, and C. As such, when the three bundles are connected to one another and operated, if an error is generated in one bundle, a bundle referring to the bundle having an error stops operating. For example, when the application bundle A refers to the application bundle B, and the application bundle B refers to the application bundle C, if an error is generated in the operation of the bundle C, the bundle A not directly referring to the bundle C stops operating. However, in the OSGI framework 210, all the bundles A, B, and C are represented as "Activate", and accordingly, the error may not be checked without confirming actual internal operating information. Accordingly, after confirming whether the actual operating is performed or not, the XML file needs to be opened and checked in order to detect which bundle has an error. However, the OSGI framework 210 does not provide a graphic screen and displays only ones operating on a simple command window. When an error is generated or a problem occurs in a bundle, an Exception error message or a simple error message, which is supported by the OSGI framework 210, is displayed on the OSGI command window.

FIG. 3 illustrates commands displayed when an error is generated in the OSGI framework 210, according to an embodiment. That is, when an error is generated in the OSGI framework 210 as illustrated in FIG. 2, an Exception error message 300 is displayed on a command window. To find the reason why the error is generated, an XML file that has described Export/Import of a bundle needs to be checked. Many interfaces are described in the XML file, and an internal operating method of the OSGI framework 210 is described in the XML file, and thus it is difficult to know a relation between bundles. Also, to detect an error of a bundle C in a bundle A, firstly, an XML file of the bundle A needs to be analyzed to know a relation that the bundle A refers to a bundle B, and then a XML file of the bundle B needs to be analyzed to know a relation that the bundle B refers to the bundle C. That is, the bundle A may not find an error of the bundle C at a time.

Figure 4:
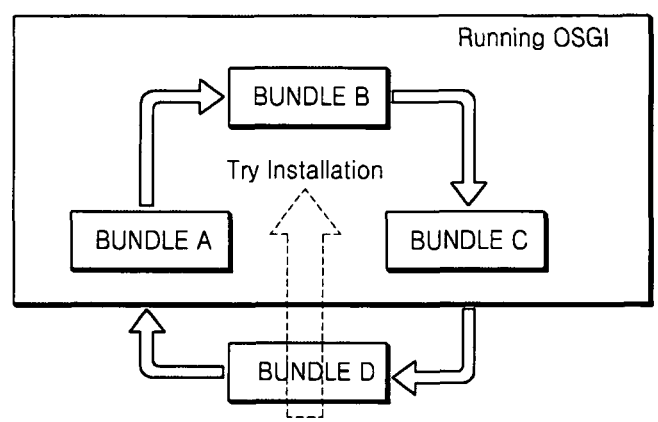
FIG. 4 illustrates a circular dependency that may occur in an OSGI framework, according to an embodiment.

FIG. 4 illustrates a circular dependency that may occur in an OSGI framework, according to an embodiment. As illustrated in FIG. 4, when a new bundle D is additionally installed in the OSGI framework in which bundles A, B and C are installed, a circular dependency may occur. That is, when the bundle D referring to a function of the bundle C is installed in the OSGI framework in which the bundle B refers to a function of the bundle A and the bundle C refers to a function of the bundle B, the bundle A refers to a function of the bundle D, and thus a circular dependency in which all the bundles refer to mutual functions is established. For example, in order to analyze a coordinate of the area on the basis of location information of a Google map, to download a photograph, and then to upload the photograph to the Google map again (hereinafter, "scenario A"), a case where a developer newly developed a "bundle capable of uploading an image file of a specific area photograph of a Daum sky view to a Google map" is examined. In this instance, to perform the "scenario A" in an image forming apparatus, the newly developed "bundle capable of uploading an image file of a particular area photograph of a Daum sky view to a Google map" should be additionally installed in the OSGI framework of the image forming apparatus in which "Google map", "Google earth" and "Daum sky view" are installed. Here, the "Google earth" imports a "map area information module" from the "Google map", and the "Daum sky view" imports a "map area coordinate module" from the "Google earth". When the "Google map" imports an "area photograph upload module" from the "bundle capable of uploading an image file of a specific area photograph of a Daum sky view to a Google map", if the "Google map" additionally installs the "bundle capable of uploading an image file of a specific area photograph of a Daum sky view to a Google map" importing an "area photograph download module" from the "Daum sky view" in the OSGI framework of the image forming apparatus, the "Google map", the "Google earth", the "Daum sky view" and the "bundle capable of uploading an image file of a specific area photograph of a Daum sky view to a Google map"

establish a circular dependency in which all the bundles refer to mutual functions. That is, the "bundle capable of uploading an image file of a specific area photograph of a Daum sky view to a Google map", which is a newly developed bundle, is additionally installed in the OSGI framework of the image forming apparatus, so that the additionally installed bundle and the previously installed bundles establish a circular dependency. In order for a bundle to operate in the OSGI framework, any one bundle should start operating first. Accordingly, when a circular dependency is established between the bundles, each bundle waits for other bundles to start operating, as a result, a deadlock is generated, and thus the related bundle remains in a standby state without operating.

FIG. 5 is a flowchart of a method of installing a bundle in an image forming apparatus operating based on an OSGI framework, according to an embodiment. In Operation 500, a selection of a bundle to be installed in the OSGI framework of the image forming apparatus is input through a server.

FIG. 6 illustrates a user interface 600 for selecting a bundle, according to an embodiment. The user interface 600 of FIG. 6 is implemented in a server. As illustrated in FIG. 6, bundles which are previously installed in an OSGI framework of an image forming apparatus and a bundle to be installed are displayed. In the user interface 600, bundles A, B, and C in which a "Status" 610 is indicated as "Activate" denote bundles installed in the OSGI framework of the image forming apparatus. A bundle D 620 in which the "Status" 610 is indicated as "Stop" denotes a bundle that is not installed in the OSGI framework of the image forming apparatus. Accordingly, in the user interface 600, a selection of the bundle D 620 in which the "Status" 610 is indicated as "Stop" is input, and a selection of an "ADD" 630 is input.

In Operation 510, the selected bundle is uploaded to a server.

Figures 7, 8:
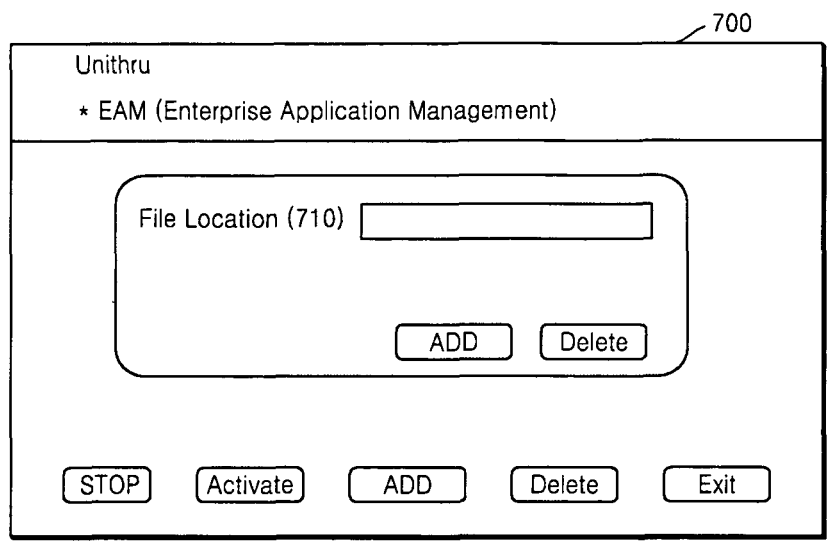
FIG. 7 illustrates a user interface for uploading a selected bundle, according to an embodiment.
FIG. 8 illustrates descriptions written in an XML file, according to an embodiment.

FIG. 7 illustrates a user interface 700 for uploading a selected bundle, according to an embodiment.

In Operation 500, a selection of a bundle to be installed in the user interface 600 is input, and when an "Add" click is input, the user interface 700 of FIG. 7 is displayed on the server. In a "File Location" 710 of the user interface 700, if a location of a file in which the selected bundle D is to be installed is designated, an upload of the bundle D is started in the designated location of the server.

In Operation 520, the bundles that are operating in the image forming apparatus are checked. It is checked whether the bundles A, B, and C, which are in an "active" state in the image forming apparatus, are normally operating.

In Operation 530, the bundle uploaded to the server is checked.

In Operation 540, information related to a bundle is extracted from an XML file of a referring bundle and is additionally written in a manifest file.

FIG. 8 illustrates descriptions written in an XML file, according to an embodiment.

In Operation 540, an "EventbeanResourceListenerOsgi" 800 written in an "id" item, an "EventBeanResourceListenerBeanId" 810 written in a "ref" item, and an "org.osgi.service.event.EventHandler" 820 written in an "interface" item are extracted from the XML file of FIG. 8. A name of a bundle is written in the "id" item, a name of a referring bundle is written in the "ref" item, and an interface name of a referring bundle is written in the "interface" item.

In Operation 540, information related to a bundle is extracted from the XML file of the bundle and is written in the manifest file. In this instance, when the related information is written in the manifest file of the referring bundle, the related information written in the manifest file is extracted, and the extracted related information is additionally written in the manifest file. In general, information of a bundle is written in a manifest file of an OSGI framework bundle. The information of the bundle includes a name, a version, a function, and static and dynamic methods with another bundle. In an embodiment, the related information extracted from the XML file of the referring bundle is added in the manifest file.

Figures 9, 10, 11:
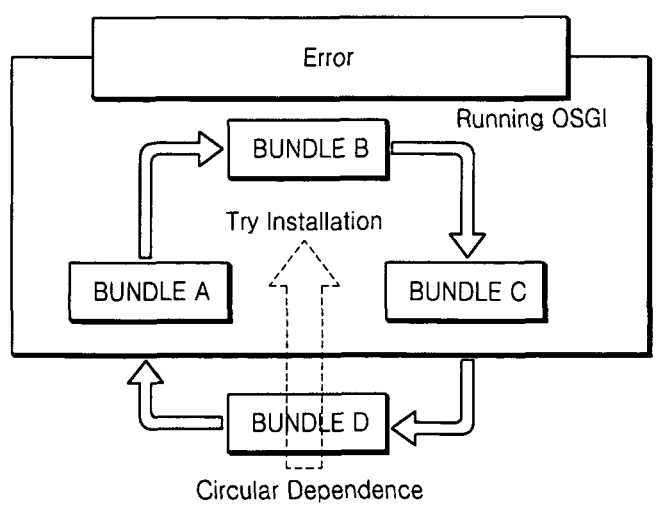
FIG. 9 illustrates related information that is additionally written in a manifest file, according to an embodiment.
FIG. 10 illustrates detailed related information that is additionally written in a manifest file, according to an embodiment.
FIG. 11 illustrates a circular dependency and an error message that are generated according to installation of a new bundle, according to an embodiment.

FIG. 9 illustrates related information that is additionally written in a manifest file, according to an embodiment. In the manifest file of a bundle, according to an embodiment, a "Header Name" 910, an "Interface Name" 920, a "Description" 930, and an "Involved interface" 940 are additionally written in a manifest file of a bundle of a generally used OSGI framework. However, the "Description" 930 may not be written under different conditions.

FIG. 10 illustrates detailed related information that is additionally written in a manifest file, according to an embodiment. As illustrated in FIG. 10, an "Import-Interface" 1010 is written in the "Header Name", which indicates that the manifest file includes related information. An "abc" 1020, which is a name of an interface which a bundle starting uploading refers to, is written in the "Interface Name" 920. A "this is for device control, Bundle D" 1030 is written in the "description" 930, which indicates that the manifest file is about the bundle that has started uploading. A "ccc from Bundle B; aab from Bundle C; bbb from Bundle D" 1040 is written in the "Involved interface" 940, in which the "ccc from Bundle B; aab from Bundle C; bbb from Bundle D" 1040 is reference information of the bundle including an interface that a bundle having started uploading refers to. The reference information includes information representing names of bundles which the bundle including an interface, that a bundle having started uploading refers to, refers to and interfaces names which the bundle refers to, in the order that the bundle having started uploading refers to.

In Operation 550, related information written in a manifest file is analyzed. The related information written in the manifest file of a bundle uploaded to a server is analyzed to determine an operation state of bundles that the bundle uploaded to the server depends on or a relation between the bundles that the bundle uploaded to the server depends on. As a result of the determining, if an error does not exist in an operation state of the bundles and a relation between the bundles, the method proceeds to Operation 560, otherwise, the method proceeds to Operation 580.

According to descriptions written in the manifest file of FIG. 10, there is a correlation as follows. The bundle software D uploaded to the server refers to a function that an interface name is "abc" from the bundle A. The bundle A refers to a function that an interface name is "ccc" from the bundle B. The bundle B refers to a function that an interface name is "aab" from the bundle C. The bundle C refers to a function that an interface name is "bbb" from the bundle D. That is, according to the related information extracted from the manifest file of FIG. 10, a circular dependency in which the bundle D refers to the bundle A, the bundle A refers to the bundle B, the bundle B refers to the bundle C, and the bundle C refers to the bundle D may be analyzed. As a result of the analyzing in Operation 550, if the bundle uploaded to the server has a circular dependency, the method proceeds to Operation 560. Even when any one bundle from among the bundles which the bundle uploaded to the server refers to does not operate, the process proceeds to Operation 560.

In Operation 560, uploading of a bundle is stopped. When there is an error in the circular dependency between the bundle and bundles which the bundle, that is being uploaded, refers to or when the bundle which the bundle, that is being uploaded, refers to does not operate, uploading of the bundle is stopped.

In Operation 570, an error in installation of a bundle is displayed together with an error message. For example, if a circular dependency is established between the bundle that is being uploaded and a bundle that is previously installed in an OSGI framework, the circular dependency and an error message are displayed on a server.

FIG. 11 illustrates a circular dependency and an error message that are generated according to installation of a new bundle, according to an embodiment.

In Operation 570, when a new bundle is uploaded to a server in order to install the new bundle in an OSGI framework of an image forming apparatus, a user interface that schematically shows a circular dependency, as illustrated in FIG. 10, is displayed on the server so as to allow a user to easily recognize a circular dependency between the bundles. Related information written in the manifest file of FIG. 9 may also be displayed on the server.

In Operation 580, uploading of a bundle is finished. A bundle that the bundle that is being uploaded depends on normally operates and does not have a circular dependency with the bundle that the bundle that is being uploaded depends on, and thus there is no error in installation of a bundle, and therefore, uploading of a bundle continues.

According to the above-described method of controlling installation of a bundle in an image forming apparatus operating based on an OSGI framework, according to an embodiment, when a new bundle is installed, a to-be-installed bundle has a circular dependency with another bundle that is previously installed in an OSGI framework, or when a bundle which the to-be-installed bundle refers to does not operate, the bundle is prevented from being uploaded to a server to prevent installation of the bundle. A correlation between bundles is written in a manifest file so as to allow a developer to easily recognize a reason of an error. Also, a circular dependency between the bundles is schematically displayed together with an error message so as to allow a user to easily recognize a circular dependency between the bundles.

Figure 12:
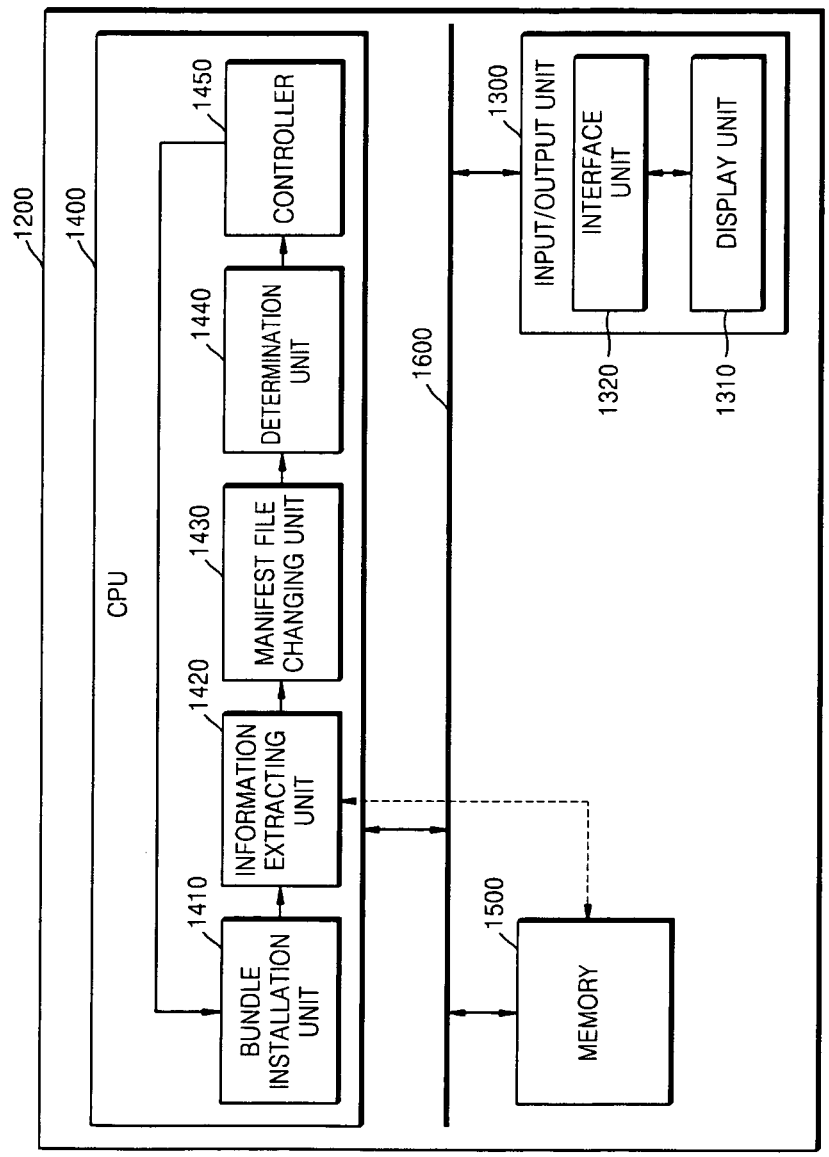
FIG. 12 is a block diagram illustrating an image forming apparatus operating based on an OSGI framework, according to an embodiment.

FIG. 12 is a block diagram illustrating an image forming apparatus 1200 operating based on an OSGI framework, according to an embodiment.

As illustrated in FIG. 12, the image forming apparatus 1200 operating based on an OSGI framework controlling installation of a bundle, according to an embodiment, includes an input/output unit 1300, a central processing unit (CPU) 1400, a memory 1500, and a bus 1600. The input/output unit 1300, the CPU 1400, and the memory 1500 are connected to one another through the bus 1600, and data may be received or sent through the bus 1600. However, the configuration of the image forming apparatus 1200 of FIG. 12 is just an example for describing an embodiment, and one of ordinary skill in the art would understand that various other configurations are possible.

According to an embodiment, the input/output unit 1300 includes a display unit 1310 and an interface unit 1320. The CPU 1400 of the image forming apparatus 1200 includes a bundle installation unit 1410, an information extracting unit 1420, a manifest file changing unit 1430, a determination unit 1440, and a controller 1450.

The display unit 1310 displays a user interface for selecting a bundle to be installed in an OSGI framework of the image forming apparatus 1200. In an embodiment, the user interface 600 of FIG. 6 is displayed. The display unit 1310 may also be implemented in a server connected to the image forming apparatus 1200 through a network.

Selection of a bundle to be installed in the OSGI framework of the image forming apparatus 1200 is input to the input/output unit 1300 through the interface unit 1320 in the user interface displayed on the display unit 1310. The input/output unit 1300 may also be implemented in the server connected to the image forming apparatus 1200 through a network.

The bundle installation unit 1410 installs the bundle selected through the interface unit 1320. In an embodiment, if a bundle D is selected through the interface unit 1320, the selected bundle D is installed.

The information extracting unit 1420 extracts related information between a bundle and another bundle from an XML file of the bundle stored in the memory 1500. The information extracting unit 1420 extracts related information about a bundle from an XML file of the bundle which a bundle to be installed in the bundle installation unit 1410 refers to. FIG. 8 is a view illustrating contents written in an XML file, according to an embodiment. The information extracting unit 1320 extracts the "EventbeanResourceListenerOsgi" 800 written in the "id" item, the "EventBeanResourceListenerBeanId" 810 written in the "ref" item, and the "org.osgi.service.event.EventHandler" 820 written in the "interface" item from the XML file of FIG. 8. A name of a bundle is written in the "id" item, a name of a referring bundle is written in the "ref" item, and an interface name of a referring bundle is written in the "interface" item. As such, the information extracting unit 1420 may extract related information between a bundle and another bundle from an XML file.

The manifest file changing unit 1430 adds the related information extracted in the information extracting unit 1420 to a manifest file and changes the manifest file into a manifest file according to an embodiment. Descriptions additionally written in the manifest file are as illustrated in FIG. 10.

According to an embodiment, a manifest file of a selected bundle has a form of the file of FIG. 9, and detailed related information written in the manifest file is as described in FIG. 10.

When a bundle is installed in an OSGI framework, the determination unit 1440 determines whether or not an error is generated in the operation of a framework on the basis of the related information written in the manifest file. The determination unit 1440 determines an operation state of bundles which a selected bundle refers to or a relation between the selected bundle and bundles which the selected bundle refers to, by analyzing related information written in the manifest file. When a bundle which the selected bundle D refers to refers to a circularly selected bundle again, the determination unit 1440 determines that the selected bundle has a circular dependency, on the basis of the related information written in the manifest file. Referring to FIG. 10, bundles are circularly referred in the order of D→A→B→C→D, on the basis of the related information written in the manifest file. Accordingly, the determination unit 1440 determines that the selected bundle D has a circular dependency. The determination unit 1440 may also determine whether a bundle which the selected bundle refers to normally operates or not, on the basis of the related information written in the manifest file.

When the determination unit 1440 determines that there is a circular dependency in which a bundle which the selected bundle D refers to refers to the circularly selected bundle D, the controller 1450 controls the bundle installation unit 1410 so as to stop installation of the selected bundle. Also, when the determination unit 1440 determines that any one bundle from among the bundles which the selected bundle D refers to does not operate, the controller 1450 controls the bundle installation unit 1410 so as to stop installation of the selected bundle D.

When the determination unit 1440 determines that there is an error in installation of the selected bundle D, the display unit 1310 displays a reason of the error together with an error message. For example, when the determination unit 1440 determines that there is a circular dependency between the selected bundle and the bundles which the selected bundle D refers to, the display unit 1310 displays the circular dependency between the selected bundle and other bundles together with an error message. The display unit 1310 may also display related information about bundles related to the selected bundle written in the manifest file.

One or more embodiments can also be embodied as computer readable instructions such as computer readable codes on at least one computer readable recording medium. A computer readable recording medium is any data storage device that can store computer readable instructions and data which can be thereafter read by a computer system. Examples of a computer readable recording medium include read-only memory (ROM), random-access memory (RAM), CD-ROMs, magnetic tapes, floppy disks, optical data storage devices, and etc. At least one computer readable recording medium can also be distributed over network coupled computer systems so that the computer readable instructions such as computer readable codes are stored and executed in a distributed fashion. The computer readable instructions may be executed by one or more processors. A computer-readable medium may also be embodied in at least one application specific integrated circuit (ASIC) or Field Programmable Gate Array (FPGA), which executes (processes like a processor) computer readable instructions. Examples of computer readable instructions include both machine code, such as produced by a compiler, and files containing higher level code that may be executed by a computer or processor using an interpreter. The described hardware devices may be configured to act as one or more software modules in order to perform the operations and methods described above, or vice versa.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A method of installing a bundle in an image forming apparatus operating based on a framework capable of sharing a function among a plurality of bundles, the method comprising:

extracting, from an XML file of the bundle to be installed, first information describing a relationship between the bundle to be installed and a first pre-installed bundle which the bundle to be installed refers to;

identifying the first pre-installed bundle based on the extracted first information; and extracting, from an XML file of the identified first pre-installed bundle, second information describing a relationship between the identified first pre-installed bundle and a second pre-installed bundle which the identified first pre-installed bundle refers to;

writing, to a manifest file of the bundle to be installed, the extracted first and second information;

determining whether the first pre-installed bundle and the second pre-installed bundle which the first pre-installed bundle refers to are operated in the framework based on the manifest file; and selectively installing the bundle to be installed in the image forming apparatus according to a result of the determining, wherein the writing, to the manifest file of the bundle to be installed, the extracted first and second information comprises generating circular dependency information in the manifest file based on the extracted first and second information.

2. The method of claim 1, wherein the manifest file comprises a header representing that the manifest file includes the first information, a name of an interface which the bundle to be installed refers to, and reference information of the first pre-installed bundle comprising the interface.

3. The method of claim 2, wherein the reference information regarding the first pre-installed bundle comprises information representing a name of the second pre-installed bundle which the first pre-installed bundle refers to and an interface name which the first pre-installed bundle refers to.

4. The method of claim 1, wherein the installing of the bundle to be installed comprises stopping installation of the bundle to be installed in the image forming apparatus, if any one bundle from among at least one bundle which the bundle to be installed refers to does not operate in the framework.

5. The method of claim 1, wherein the installing of the bundle to be installed comprises stopping installation of the bundle to be installed in the image forming apparatus, if it is determined that a circular dependency is established in the framework based on the extracted first and second information, wherein the circular dependency that the first pre-installed bundle which the bundle to be installed refers to circularly refers to the bundle to be installed.

6. The method of claim 1, further comprising displaying a circular dependency together with an error message, if it is determined that a circular dependency is established in the framework based on the extracted first and second information wherein the circular dependency that the first pre-installed bundle which the bundle to be installed refers to circularly refers to the bundle to be installed.

7. The method of claim 6, wherein the displaying of the circular dependency together with an error message comprises displaying the circular dependency schematically.

8. The method of claim 1, further comprising displaying the first and second information written in the manifest file.

9. At least one non-transitory computer readable recording medium storing computer readable instructions that when executed control at least one processor to implement a method of installing a bundle in an image forming apparatus operating based on a framework capable of sharing a function among a plurality of bundles, the method comprising:

extracting, from an XML file of the bundle to be installed, first information describing a relationship between the bundle to be installed and a first pre-installed bundle which the bundle to be installed refers to;

identifying the first pre-installed bundle based on the extracted first information;

extracting, from an XML file of the identified first pre-installed bundle, second information describing a relationship between the identified first pre-installed bundle and a second pre-installed bundle which the identified first pre-installed bundle refers to;

writing, to a manifest file of the bundle to be installed, the extracted first and second information;

determining whether the first pre-installed bundle and the second pre-installed bundle which the first pre-installed bundle refers to are operated in the framework based on the manifest file; and selectively installing the bundle to be installed in the image forming apparatus according to a result of the determining, wherein the writing, to the manifest file of the bundle to be installed, the extracted first and second information comprises generating circular dependency information in the manifest file based on the extracted first and second information.

10. An image forming apparatus operating based on a framework capable of sharing a function among a plurality of bundles, a central processing unit (CPU) of the image forming apparatus comprising:

an information extracting unit to extract from an XML file of the bundle to be installed, first information describing a relationship between the bundle to be installed and a first pre-installed bundle which the bundle to be installed refers to, to identify the first pre-installed bundle based on the extracted first information, and to extract from an XML file of the identified first pre-installed bundle, second information describing a relationship between the identified first pre-installed bundle and a second pre-installed bundle which the identified first pre-installed bundle refers to;

a file changing unit to write, to a manifest file of the bundle to be installed, the extracted first and second information;

a bundle installation unit to install the bundle to be installed;

a determination unit to determine whether the first pre-installed bundle and the second pre-installed bundle which the first pre-installed bundle refers to are operated in the framework based on the manifest file; and a controller to selectively control installation of the bundle to be installed to image forming apparatus according to a result of the determining, wherein the file changing unit generates circular dependency information in the manifest file based on the extracted first and second information, when the file changing unit writes, to a manifest file of the bundle to be installed, the extracted first and second information.

11. The image forming apparatus of claim 10, wherein the manifest file comprises a header to represent that the manifest file includes the first information, a name of an interface which the bundle to be installed refers to, and reference information of the first pre-installed bundle comprising the interface.

12. The image forming apparatus of claim 11, wherein the reference information regarding the first pre-installed bundle comprises information representing a name of the second pre-installed bundle which the first pre-installed bundle refers to and an interface name which the first pre-installed bundle refers to.

13. The image forming apparatus of claim 10, wherein the controller controls the bundle installation unit so as to stop installation of the bundle to be installed in the image forming apparatus, if any one bundle from among at least one bundle which the bundle to be installed refers to does not operate in the framework.

14. The image forming apparatus of claim 10, wherein the controller controls the bundle installation unit so as to stop installation of the bundle to be installed in the image forming apparatus, if it is determined that a circular dependency is established in the framework based on the extracted first and second information, wherein the circular dependency that the first pre-installed bundle which the bundle to be installed refers to circularly refers to the bundle to be installed.

15. The image forming apparatus of claim 10, further comprising a display unit to display a circular dependency together with an error message, if it is determined that a circular dependency is established in the framework based on the extracted first and second information, wherein the circular dependency that the first pre-installed bundle which the bundle to be installed refers to circularly refers to the bundle to be installed.

16. The image forming apparatus of claim 15, wherein the display unit displays the circular dependency schematically.

17. The image forming apparatus of claim 15, wherein the display unit displays the first and second information written in the manifest file.

* * * * *